United States Patent [19]
Gigliotti, Jr. et al.

[11] 3,972,367
[45] Aug. 3, 1976

[54] PROCESS FOR FORMING A BARRIER LAYER ON CERAMIC MOLDS SUITABLE FOR USE FOR HIGH TEMPERATURE EUTECTIC SUPERALLOY CASTING

[75] Inventors: Michael F. X. Gigliotti, Jr., Scotia; Charles D. Greskovich, Schenectady, both of N.Y.

[73] Assignee: General Electric Company, Schenectady, N.Y.

[22] Filed: June 11, 1975

[21] Appl. No.: 586,049

[52] U.S. Cl. .................. 164/72; 164/16; 164/138
[51] Int. Cl.² .............. B22C 3/00; B22C 9/12; B22C 1/00
[58] Field of Search ............ 164/72, 66, 16, 33, 164/138

[56] References Cited
UNITED STATES PATENTS

| | | |
|---|---|---|
| 3,743,003 | 7/1973 | Brown .................................. 164/72 |
| 3,779,816 | 12/1973 | Mao ..................................... 164/72 |
| 3,802,482 | 4/1974 | Phipps, Jr. .......................... 164/72 |
| 3,824,113 | 7/1974 | Mentor et al. ...................... 164/72 |

Primary Examiner—Harrison L. Hinson
Attorney, Agent, or Firm—Donald M. Winegar; Joseph T. Cohen; Jerome C. Squillaro

[57] ABSTRACT

A method of forming a metal oxide barrier layer at the interface between a refractory oxide-silica investment mold and a contained metal superalloy includes the firing of the mold or the mold-metal system, in a controlled prevailing atmosphere having a predetermined amount of oxygen therein. The barrier layer enables directional solidification of the contained superalloy at elevated temperatures to occur without metal-mold reaction.

54 Claims, 2 Drawing Figures

250X

PROCESS FOR FORMING A BARRIER LAYER ON CERAMIC MOLDS SUITABLE FOR USE FOR HIGH TEMPERATURE EUTECTIC SUPERALLOY CASTING

BACKGROUND OF THE INVENTION

1. Field of the Invention

This invention relates to a method for making investment molds having a barrier layer at the mold-metal interface for the casting and directional solidification of superalloys.

2. Background of the Invention

Shell molds for precision casting of steel and superalloy parts are, in general, composed of refractory oxide particles bonded together by a silica or phosphate gel. Such molds are generally formed by the "lost wax" process wherein a wax pattern is immersed repeatedly in a liquid slurry of the refractory oxide particles in a silica- or phosphate-bearing binder. Sufficient time is provided between immersions to allow the slurry coat to partially or completely dry on the wax. After a sufficient thickness of ceramic has built up on the wax, the wax is removed by chemical dissolution or melting in a steam autoclave or in a furnace. The mold is then fired, typically at 1,000°C for 1 hour, to give it sufficient strength to withstand the casting process.

Chemical reactions between the mold and the cast metal are a minor problem in conventional casting due to relatively low temperatures and short times that the mold is in contact with molten metal. However, for the plane front solidification of eutectic superalloys, severe metal-mold reactions frequently occur. These are due to the long contact time (up to 30 hours) of molten metal with the mold, the high temperatures (~1,800°C) required in the casting process to enable high growth rates during solidification, and the high concentration of reactive elements in the superalloy such as carbon, aluminum, and titanium. In particular, attempts to cast tantalum carbide-reinforced, eutectic superalloys with high nickel content in standard shell molds results in such a severe loss of carbon that the tantalum carbide reinforcing phase is absent from the final cast microstructure, producing a useless casting.

The mold-associated cause of this reaction is the silica phase (5–15 Wt%) present in the shell mold. Silica has a small negative free energy of formation and is reduced by the reactive elements in the eutectic super-alloys.

With reference to FIG. 1, when NiTaC-13, a monocarbide reinforced superalloy, is cast in mold 10, an example of the prior art, a reaction occurs between the cast metal and the silica phase of the mold. The result of this reaction is the bright phase denoted by reference numeral 12 which is NiTaC-13 metal penetrated into the mold and reacted with the silica phase of the mold. The resultant casting is defective due to decarburization of the cast alloy and because of poor surface finish.

Other prominent features in FIG. 1 include plastic mounting media 14, coarse backup grains 16 of alumina from the fluidized bed employed for the application of a sand coat between layers of mold materials, pores or voids 18 in the mold structure which result because of material pullout during polishing, or an actual void in the mold structure, and undissolved alumina 20 of one of the flours comprising the material composition.

Other features shown are mullite 22, light gray in color, a silica rich liquid phase 24 in the mullite 22, dark gray in color, and small grains 26 of flour of alumina material of the face coat. There is no barrier layer present at what may be termed the interface between the mold and the cast metal.

An object of this invention is to provide a new and improved process for making molds for the casting and directional solidification of superalloys therein.

Another object of this invention is to provide a new and improved process for the casting and directional solidification of superalloys.

Other objects of this invention will, in part, be obvious and will, in part, appear hereinafter.

BRIEF DESCRIPTION OF THE INVENTION

In accordance with the teachings of this invention there is shown a new and improved method for the casting and the directional solidification of superalloys. A mold comprising a first refractory oxide material is placed inside a furnace. A controlled prevailing atmosphere is introduced into the furnace. The mold is heated to an elevated temperature in the controlled prevailing atmosphere where it is maintained thereat for a sufficient period of time to at least dissolve some of the first refractory oxide into the silica.

Preferably, the mold is heated for a period of time to form a barrier layer at the mold-metal interface. The barrier layer may be formed prior to casting the melt of metal into the mold cavity or during the casting process. The material of the barrier comprises a second refractory oxide which may be the same as, or different from, the first refractory oxide of the mold. The second refractory oxide may be derived at least in part from the mold material or at least in part from the cast melt of metal.

Suitable controlled prevailing atmosphere may comprise a mixture of an inert carrier gas such, for example, as argon, helium or any gas of Group 8 of the Periodic Table and a predetermined amount of an oxygen-bearing gas. The oxygen-bearing gas may be pure oxygen, water vapor and carbon monoxide and the like. Additionally, carbon monoxide alone is suitable for providing the controlled prevailing furnace atmosphere. Hydrogen and hydrogen containing a predetermined amount of water vapor therein also suitable for providing the desired controlled prevailing atmosphere.

DESCRIPTION OF THE INVENTION

Figure 1:
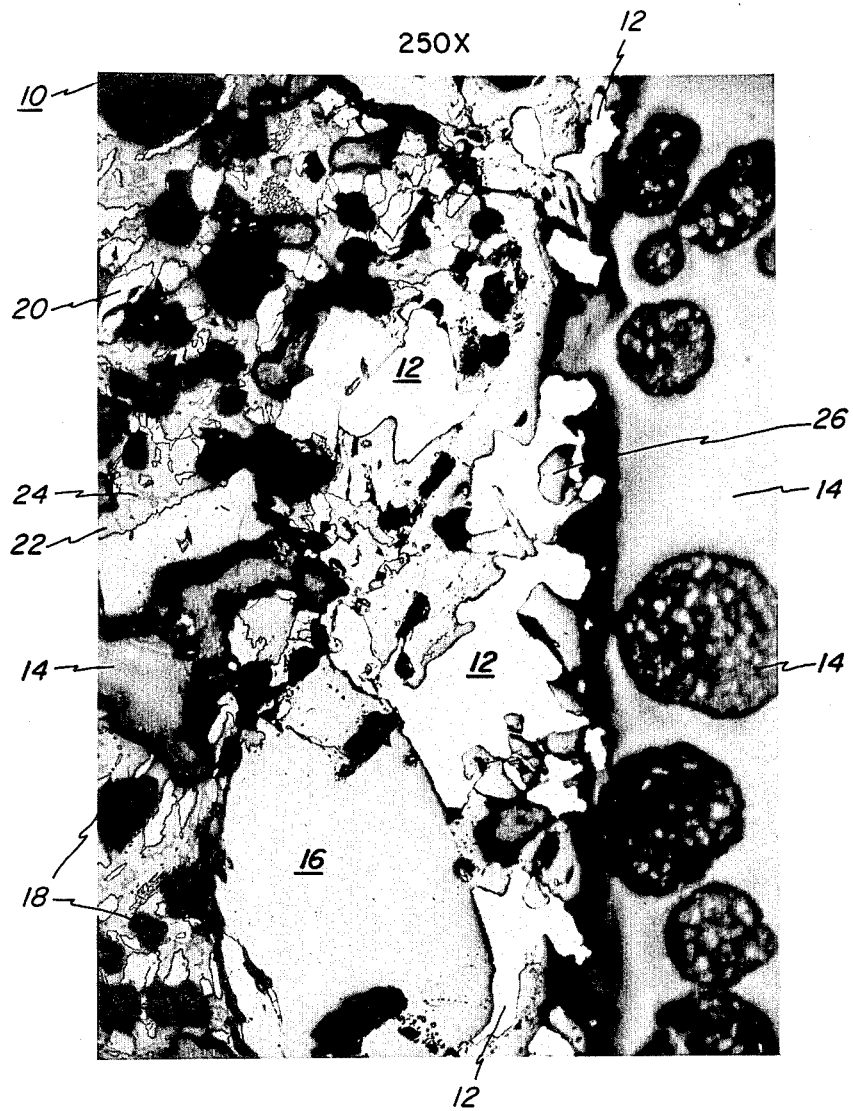
FIG. 1 is a reflected light photomicrograph, at 250 X, of a polished section of the reaction zone at the metal-mold interface of a prior art mold.
Figure 2:
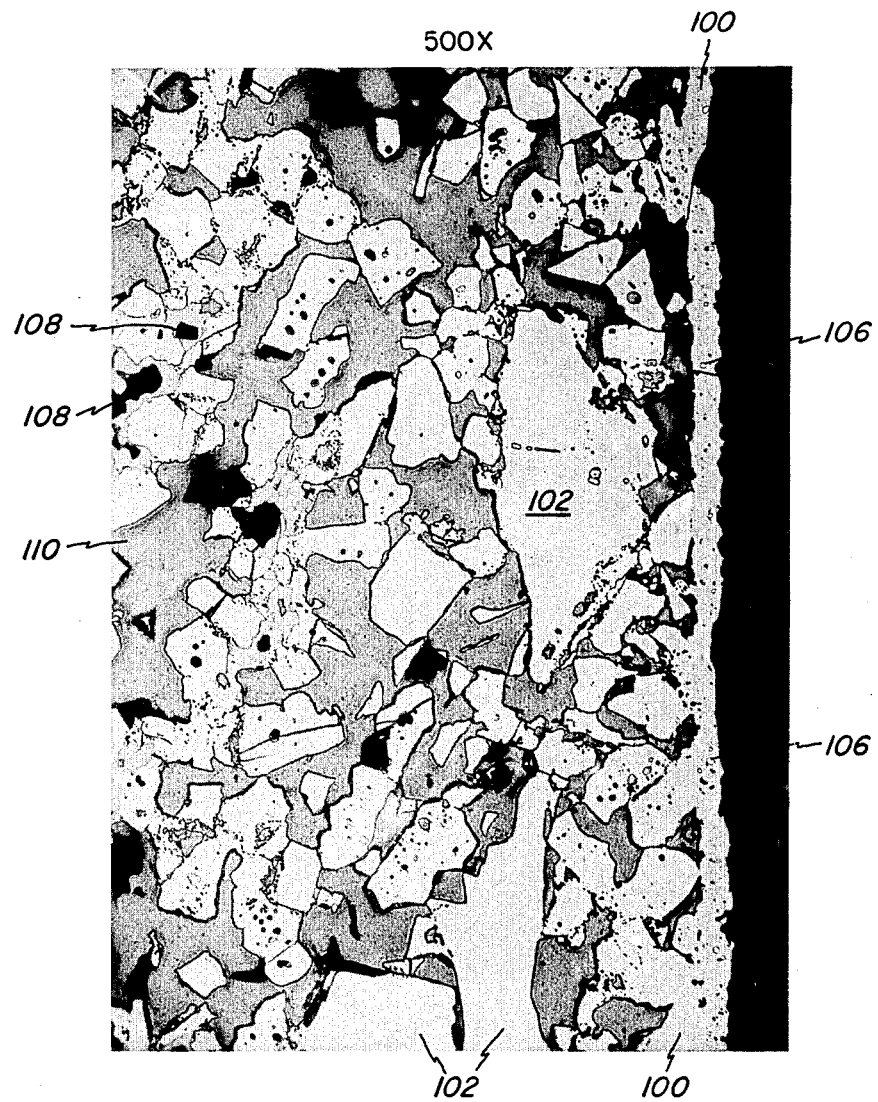
FIG. 2 is a reflected light photomicrograph, at 500 X, of a polished section of the barrier layer at the metal-mold interface of a mold made in accordance with the teachings of this invention.

With reference to FIG. 2, there is shown a portion of a mold suitable for the casting and directional solidification of superalloys therein. A barrier layer 100 is present at the interior wall surfaces of the mold. The interior wall surfaces define the cavity in the mold into which metal is cast for directional solidification.

Other items identifiable in FIG. 2 are coarse grains 102 of alumina from a sand coat. Fine grains 104 of alumina are principally from the alumina flour mixture of the face coating. Bright spots 106 are small metal alloy inclusions in the protective alumina barrier layer 100. Dark areas 108 are voids or holes occurring as a result of grain pullouts during polishing of the specimen. Light gray areas 110 are plastic mounting material representative of the porosity in the mold structure after casting and solidification of a superalloy in a mold resulting from the reduction of the silica binder material.

The barrier layer 100 enables one to successfully cast planar front solidified eutectic superalloys which contain tantalum carbide as the reinforcing phase therein. The barrier layer 100 is supported by a mold microstructure which does not contain material which will attack the barrier layer 100 or the metal cast in the mold. The layer 100 may be as thin as possible, on the order of 1 micron, provided it prevents cast metal penetration of the mold.

The barrier layer 100 may be formed in several ways. First, the layer 100 may be formed by firing the mold at an elevated temperature, for a sufficient period of time, in a controlled prevailing furnace atmosphere. Second, the layer 100 may be formed in the same manner only just prior to metal casting as part of a continuous process. Third, the layer 100 may be formed in situ when the melt of metal is cast into the mold.

The material of the barrier layer 100 comprises a refractory oxide. The refractory oxide may be derived from the mold material, material of the melt of metal cast in the mold or from both. In particular, when the mold is of an alumina-silica, magnesia-silica, calcium oxide-silica and yttria-silica composition, the barrier layer 100 is solid alumina, magnesia, magnesia, calcia and yttria, respectively. Other materials comprising the barrier layer 100 are magnesium aluminate, calcium aluminate, yttrium aluminate and solutions and/or intermediate phases formed by aluminum, calcium, magnesium and yttrium with oxide constituents from the superalloy metal melt.

The mold microstructure in back of the layer 100 does not have any silica-bearing phases present. The barrier layer 100 prevents the cast metal from "seeing" silica in the mold and attacking the same.

In order to describe the invention more fully and for no other purpose, the mold material is said to be of alumina with a silica binder.

As stated previously, the barrier layer 100 may also be formed in situ during the casting process. In either case, it is necessary that there be an appreciable amount of alumina dissolved into the silica phases.

We have found that the alumina-silica molds should be fired at an elevated temperature of from 1,600°C to approximately 1,850°C for a period of time of from ¼ to 2 hours. Preferably, the molds are fired at approximately 1,700°C ± 50°C for about 1 hour to obtain molds which exhibit excellent mold performance. These temperature ranges and periods of time at temperature are postulated on the need to have alumina contained in the silica phase of the mold material.

For example when the continuous protective layer 100 of alumina is produced by the reduction of the silica-bearing species of the mold, it is a requirement that at all points in initial contact with the melt, cast and solidifying therein, there is sufficient aluminum oxide or aluminum oxide in chemical solution or compound with the silica of the mold such that the following chemical reactions might be able to take place:

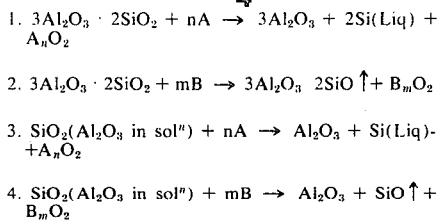

where

A and B are alloy constituents other than aluminum that reduce the alumina-containing silica or the mullite leaving alumina behind. Additionally, silica or a reduced silicon oxide is, during the same period of time, removed by solution into the alloy or is removed by vaporization.

Alternately, the mechanism of forming the layer 100 to protect the mold-metal surface interface may involve the cast alloy itself to be the provider of the material of the layer 100. For example, in the casting and directional solidification of an alloy of nickel, chromium, cobalt, aluminum, tungsten, rhenium, vanadium, tantalum and carbon, an alumina-silica investment mold is employed. The material of the layer 100 is alumina and may come from the aluminum of the cast metal. It is believed that should this be the mechanism involved, then the aluminum from the cast metal alloy reduces the silica of the mold to form aluminum oxide plus silicon metal or a suboxide of silicon. The silicon oxide compounds are removed from the mold-metal interface as indicated in the following equations:

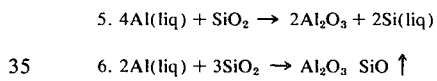

Should the aluminum for the aluminum oxide barrier layer 100 be from the cast alloy, the loss of aluminum from the cast metal alloy is negligible as determined by chemical analysis of the cast finished product.

A still further proposed mechanism which may be the cause of the formation of the barrier layer 100 is that the metal of the layer 100 is derived again from the cast metal alloy and is oxidized by the prevailing furnace atmosphere. The metal oxide of the layer 100 is stabilized on the outside of the cast melt by surface tension. We have observed that it apparently is necessary for the prevailing furnace atmosphere to be slightly oxidizing with respect to the melt. The furnace atmosphere is most generally an inert gas such, for example as argon, helium or any gas of Group 8 of the Periodic Table. The oxidizing atmosphere is achieved by introducing a predetermined amount of pure oxygen or oxygen-bearing gas such, for example, as air, into the gas, bubbling all or a portion of the inert gas through water maintained at a predetermined temperature and the like. Alternately, hydrogen or hydrogen embodying a predetermined amount of water vapor may also be employed as an oxidizing atmosphere.

It has been found that castings produced in molds of metal oxide-silica materials in a furnace atmosphere of substantially pure inert atmosphere are not acceptable for commercial products. However, a small amount of oxygen introduced into the same inert atmosphere produces castings of commercial quality. The amount of oxygen may comprise from about 0.01 to about 5% of the ambient or prevailing atmosphere. Argon with a dew point of 70°F has been found to be an excellent furnace atmosphere for practicing the novel process of this invention to produce the novel mold for casting superalloys. While higher oxygen contents that is above 10%, may be utilized, problems associated with excessive slag formations will occur.

A furnace atmosphere which is capable of both oxidizing selected metallic elements of the cast metal alloy and reducing the silica of the mold material concurrently is most desirable. An example of such a furnace atmosphere is carbon monoxide. We have found that carbon monoxide will reduce mullite ($3Al_2O_3 \cdot 2SiO_2$). The chemial reactions which are believed to be occurring during the casting and solidification processes are as follows:

7. $SiO_2(Al_2O_3$ in solution$) + CO(gas) \rightarrow SiO \uparrow + Al_2O_3 + CO_2 \uparrow$ 8. $3Al_2O_3 \cdot 2SiO_2 + 2CO \rightarrow 3Al_2O_3 + 2CO_2 \uparrow + 2SiO \uparrow$ Concurrently with the reactions (7) and (8), carbon monoxide and carbon dioxide can be reduced by a metal of the superalloy-monocarbide eutectic melt material such, for example as aluminum, by the following chemical reactions:

9. $3CO_2 + 4Al \rightarrow 2Al_2O_3 + 3C$

10. $3CO + 2Al \rightarrow Al_2O_3 + 3C$

11. $3CO_2 + 2Al \rightarrow Al_2O_3 + 3CO \uparrow$

In the casting and directional solidification of superalloys, and in particular, superalloy-monocarbide materials, a Bridgeman-type furnace embodying an induction heated graphite susceptor is employed. The deliberate additions of small amounts of oxygen-containing gases such, for example, as oxygen, air, water vapor and the like, results in the formation of carbon monoxide by the reaction of the oxygen with carbon of the susceptor. Weight loss measurements have confirmed the attack of the carbon of the susceptor by the oxygen. No measureable loss of carbon from the cast alloy metal can be detected. Although the amount of carbon monoxide in the atmosphere may vary from about 10 to 100% by volume, good mold performance has been achieved when the prevailing furnace atmosphere comprises more than about 1% carbon monoxide by volume for the flow rate of an inert gas of from approximately 2.0 ft³/hr to about 2.5 ft³/hr. Preferably, carbon monoxide comprises from 1 to 10% by volume of the inert atmosphere to reduce precautions associated with handling of this toxic gas.

Alternately, carbon monoxide may be introduced into the furnace atmosphere by placing free carbon (graphite) within the confines of the furnace. The carbon or graphite is simultaneously heated to the elevated temperature of the furnace during the process and combines with the oxygen of the gas introduced into the furnace to form carbon monoxide.

Regardless of the process employed, it is desirable to fire the mold for 1 hour in one of the aforementioned prevailing controlled atmospheres to achieve primarily the effect of getting the silica reacted out of the metal-mold interface region. We desire to accomplish this by dissolving at least some of the refractory oxide into the silica.

The following examples are illustrative of the teachings of this invention:

EXAMPLE I

A silica-bonded alumina shell mold of a material composition of about 94% by weight alumina and about 6% by weight silica was prepared in a manner described in the copending application [of Paul Svec.] Ser. No. 586,025. The shell mold was placed in a Bridgeman furnace and fired at about 1700° ± 50°C for approximately 1 hour. Heating of the mold in the Bridgeman furnace was accomplished by a graphite susceptor and r.f. radiation. The prevailing furnace atmosphere was argon of commercial purity having a gas flow rate of from 2 to 3 ft³ per hour. During the last 30 minutes of the heating cycle air was introduced into the furnace by aspiration through a small port of ¼ inch diameter in the furnace wall. The interior of the furnace had a volume of about 11 cubic feet. The amount of oxygen in the gas mixture was calculated to be about 3%.

During the final 20 minutes of the mold firing cycle, the metal alloy to be cast in the mold was melted in a separate furnace above the mold. The metal alloy had the following composition:

| Nickel | 63.4% |
|---|---|
| Chromium | 4.4% |
| Cobalt | 3.3% |
| Aluminum | 5.4% |
| Tungsten | 3.1% |
| Rhenium | 6.2% |
| Vanadium | 5.6% |
| Tantalum | 8.1% |
| Carbon | 0.48% |

The metal alloy was heated to 1650° ± 50°C.

Upon completion of the mold firing cycle, the metal alloy was cast into the mold. Planar front solidification of the cast metal alloy was then practiced. The solidification process was practiced for approximately 30 hours at an elevated temperature which was controlled between 1650° and 1750°C.

Upon completing the solidification process stage, the casting was removed from the mold and both the mold and the casting were examined. The casting had excellent surface finish qualities and chemical analysis established the chemical composition to be within the calculated limits desired. No loss of carbon or aluminum could be detected from the cast metal. The reinforcement eutectic fibres of approximately $Ta_{0.75}V_{0.25}C$ were present in the casting. The mold face in contact with the cast metal showed excellent surface qualities. A barrier layer of alumina had been formed at the mold-metal interface. Silica was absent from the mold material immediately behind and in contact with the barrier layer of alumina. The barrier layer was approximately 30 microns in thickness.

EXAMPLE II

The process of Example I was repeated except that the oxygen was introduced into the prevailing furnace atmosphere by bubbling the argon gas through water maintained at room temperature 28°C.

The results of the examination of the casting and the mold were the same as before.

EXAMPLE III

The process of Example I was repeated except that the mold was not prefired before casting metal into it and the furnace atmosphere was pure argon.

The resultant casting was so decarburized that the upper three quarters of the casting lacked reinforcing monocarbide fibers. Gross surface flows caused by the chemical reaction between the metal and mold were present.

Examination of molds after processing the teachings of this invention has revealed several characteristics of the barrier layer 100. The barrier layer 100 extends substantially throughout the entire mold cavity of the mold. However, when a melt of metal is cast into the mold cavity as part of a continuous process of heating the mold to casting temperature and then cast metal directly into the mold cavity, no barrier layer 100 is formed in the upper region of the mold, that is above the metal line in the mold cavity. Also, no barrier layer 100 appears to be present in the lower, or chill region, of the mold. The barrier layer 100 apparently extends only between these two regions.

We claim as our invention:

1. A method for forming a barrier layer at the mold-metal interface in a mold suitable for the casting and directional solidification of superalloys therein including the process steps of:
   placing a mold made of a material comprising a first refractory oxide bonded together by silica within a furnace;
   introducing a controlled prevailing atmosphere into the furnace, and
   heating the mold in the controlled prevailing atmosphere at an elevated temperature for a sufficient period of time to at least dissolve some of the first refractory oxide into the silica.

2. The method of claim 1 wherein
the material of the first refractory oxide is one selected from the group consisting of aluminum oxide, calcium oxide, yttrium oxide and magnesium oxide.

3. The method of claim 2 wherein
the controlled prevailing atmosphere is a reducing atmosphere for the silica material of the mold.

4. The method of claim 2 wherein
the controlled prevailing atmosphere is formed by introducing a predetermined amount of an oxygen-bearing gas into an inert carrier gas.

5. The method of claim 4 wherein
the oxygen-bearing gas is pure oxygen.

6. The method of claim 4 wherein
oxygen comprises from 0.01 to 5% of the gas mixture.

7. The method of claim 4 wherein
the inert gas is argon.

8. The method of claim 2 wherein
the material of the first refractory oxide is aluminum oxide.

9. The method of claim 8 wherein
the material composition of the first refractory oxide is from about 80.0 to 99.9% by weight aluminum oxide and the remainder is silica.

10. The method of claim 1 wherein
heating of the mold is at a sufficiently high temperature for a sufficient time to form a barrier layer comprising a second refractory oxide integral with the remaining material of the mold, the barrier layer having a surface defining in part the cavity within the mold into which a melt of metal is cast.

11. The method of claim 10 wherein
the controlled prevailing atmosphere is a reducing atmosphere for the silica material of the mold.

12. The method of claim 10 wherein
the first and second refractory oxides are the same.

13. The method of claim 12 wherein
the refractory oxide is one selected from the group consisting of aluminum oxide, calcium oxide, yttrium oxide and magnesium oxide.

14. The method of claim 13 wherein
the refractory oxide is aluminum oxide.

15. The method of claim 1 wherein
firing of the mold is practiced prior to the casting of a melt of metal into the cavity of the mold.

16. The method of claim 15 wherein
the controlled prevailing atmosphere is a reducing atmosphere for the silica material of the mold.

17. The method of claim 1 and including the additional process steps of:
   casting a melt of metal into a cavity in the mold,
   forming a barrier layer of a second refractory oxide along a selected portion of the surfaces of the cavity of the mold and integral with the material of the mold, the barrier layer having a thickness to substantially prevent the molten metal to penetrate into the mold and to substantially retain the desired composition of the cast metal.

18. The method of claim 17 wherein
the controlled prevailing atmosphere is a reducing atmosphere for the silica material of the mold.

19. The method of claim 18 wherein
the supplied prevailing atmosphere comprises a mixture of an inert carrier gas and a predetermined amount of an oxygen-bearing gas.

20. The method of claim 19 wherein
the supplied prevailing atmosphere is provided by introducing pure oxygen into the inert gas.

21. The method of claim 20 wherein
oxygen comprises from 0.01 to 5% of the gas mixture.

22. The method of claim 21 wherein
the inert gas is argon.

23. The method of claim 19 wherein
the prevailing reducing atmosphere is provided by introducing water vapor into the inert carrier gas.

24. The method of claim 19 wherein
the prevailing reducing atmosphere is provided by introducing air into the inert carrier gas by aspiration through an aperture in the walls of the furnace.

25. The method of claim 15 wherein
the supplied prevailing atmosphere comprises a mixture of an inert carrier gas and a predetermined amount of an oxygen-bearing gas.

26. The method of claim 25 wherein
the supplied prevailing atmosphere is provided by introducing pure oxygen into the inert carrier gas.

27. The method of claim 26 wherein
oxygen comprises from 0.01 to 5% of the gas mixture.

28. The method of claim 27 wherein
the inert gas is argon.

29. The method of claim 25 wherein
the prevailing reducing atmosphere is provided by introducing water vapor into the inert carrier gas.

30. The method of claim 25 wherein the prevailing reducing atmosphere is provided by introducing air into the inert carrier gas by aspiration through an aperture in the walls of the furnace.

31. The method of claim 17 wherein
the supplied prevailing atmosphere comprises a mixture of an inert carrier gas and a predetermined amount of an oxygen-bearing gas.

32. The method of claim 31 wherein
the supplied prevailing atmosphere is provided by introducing pure oxygen into the inert carrier gas.

33. The method of claim 32 wherein
oxygen comprises from 0.01 to 5% of the gas mixture.

34. The method of claim 33 wherein
the inert gas is argon.

35. The method of claim 31 wherein
the prevailing atmosphere is provided by introducing water vapor into the inert carrier gas.

36. The method of claim 31 wherein
the prevailing atmosphere is provided by introducing air into the inert carrier gas by aspiration through an aperture in the walls of the furnace.

37. The method of claim 31 wherein
the oxygen bearing gas is carbon monoxide.

38. The method of claim 31 including practicing the process step of
heating the mold in the furnace with a graphite susceptor, and
forming carbon monoxide to mix in the inert carrier gas by reacting the graphite of the susceptor with the oxygen-bearing gas in the prevailing atmosphere introduced into the furnace.

39. The method of claim 31 including practicing the process step prior to heating the mold to an elevated temperature of
disposing a body of carbon-bearing material within the confines of the furnace, and
practicing the process step subsequent to heating the mold to an elevated temperature,
forming carbon monoxide in the inert carrier gas by reacting the carbon-bearing material with the oxygen-bearing gas in the prevailing atmosphere introduced into the furnace.

40. The method of claim 19 wherein
the oxygen-bearing gas is carbon monoxide.

41. The method of claim 31 wherein
the prevailing atmosphere is a gas selected from the group consisting of hydrogen and hydrogen containing a predetermined amount of water vapor therein.

42. The method of claim 17 wherein
the supplied prevailing controlled atmosphere is slightly oxidizing to the melt material.

43. The method of claim 31 wherein
the inert carrier gas is argon.

44. The method of claim 31 wherein
the supplied prevailing atmosphere comprises a mixture of an inert carrier gas and a predetermined amount of an oxygen-bearing gas.

45. The method of claim 44 wherein
the inert carrier gas is argon.

46. The method of claim 44 wherein
the supplied prevailing atmosphere is provided by introducing pure oxygen into the inert carrier gas.

47. The method of claim 46 wherein
oxygen comprises from 0.01 to 5% of the gas mixture.

48. The method of claim 47 wherein
the inert carrier gas is argon.

49. The method of claim 44 wherein
the prevailing atmosphere is provided by introducing water vapor into the inert carrier gas.

50. The method of claim 44 wherein
the prevailing atmosphere is provided by introducing air into the inert carrier gas by aspiration through an aperture in the walls of the furnace.

51. The method of claim 44 wherein
the oxygen bearing gas is carbon monoxide.

52. The method of claim 44 including practicing the process steps of
heating the mold in the furnace with a graphite susceptor, and
forming carbon monoxide to mix in the inert carrier gas by reacting the graphite of the susceptor with the oxygen-bearing gas in the prevailing atmosphere introduced into the furnace.

53. The method of claim 44 including practicing the process step, prior to heating the mold to an elevated temperature, of
disposing a body of carbon-bearing material within the confines of the furnace, and
practicing the process step, subsequent to heating the mold to an elevated temperature, of
forming carbon monoxide in the inert carrier gas by reacting the carbon-bearing material with the oxygen-bearing gas in the prevailing atmosphere introduced into the furnace.

54. The method of claim 44 wherein
the prevailing atmosphere is a gas selected from the group consisting of hydrogen and hydrogen containing a predetermined amount of water vapor therein.

* * * * *

Disclaimer 3,972,367.—*Michael F. X. Gigliotti, Jr.*, Scotia; and *Charles D. Greskovich*, Schenectady, N.Y. PROCESS FOR FORMING A BARRIER LAYER ON CERAMIC MOLDS SUITABLE FOR USE FOR HIGH TEMPERATURE EUTECTIC SUPERALLOY CASTING. Patent dated Aug. 3, 1976. Disclaimer filed July 28, 1980, by the assignee, *General Electric Company*.

Hereby enters this disclaimer to claims 5, 6, 20–24, 26–30, 32–36, 41, 46–50 and 54 of said patent.

[*Official Gazette September 16, 1980.*]